(12) United States Patent
Banerjee et al.

(10) Patent No.: US 8,296,409 B2
(45) Date of Patent: Oct. 23, 2012

(54) METHOD FOR ENABLING ON-DEMAND COMMUNICATION SERVICES

(75) Inventors: Nilanjan Banerjee, West Bengal (IN);
Koustuv Dasgupta, New Delhi (IN);
Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 12/122,806

(22) Filed: May 19, 2008

(65) Prior Publication Data
US 2009/0287740 A1    Nov. 19, 2009

(51) Int. Cl.
*G06F 15/173* (2006.01)

(52) U.S. Cl. .......................... 709/223; 709/249; 709/205

(58) Field of Classification Search .................. 709/237, 709/230, 229, 227, 224, 223, 206, 204, 203, 709/202, 246; 707/204, 104.1, 10; 370/352, 370/331, 242, 230; 726/9, 14, 12, 3; 715/764, 715/758, 753, 706, 846, 772, 751, 277, 200, 715/769, 273; 717/106
See application file for complete search history.

(56) References Cited

U.S. PATENT DOCUMENTS

| | | | |
|---|---|---|---|
| 6,256,771 B1 | 7/2001 | O'Neil et al. | |
| 6,330,710 B1 | 12/2001 | O'Neil et al. | |
| 7,167,899 B2 | 1/2007 | Lee et al. | |
| 2003/0187988 A1* | 10/2003 | Lee et al. | 709/227 |
| 2005/0096960 A1 | 5/2005 | Plutowski et al. | |
| 2005/0223070 A1 | 10/2005 | Ardille et al. | |
| 2006/0069714 A1 | 3/2006 | Blount et al. | |
| 2006/0212593 A1 | 9/2006 | Patrick et al. | |
| 2007/0016573 A1* | 1/2007 | Nanavati et al. | 707/5 |
| 2007/0050446 A1 | 3/2007 | Moore | |
| 2007/0094350 A1* | 4/2007 | Moore | 709/217 |

FOREIGN PATENT DOCUMENTS

| | | |
|---|---|---|
| EP | 0 985 322 B1 | 6/2006 |
| KR | 20070009517 | 1/2007 |
| WO | WO 98/54915 | 12/1998 |

OTHER PUBLICATIONS

3G Partnership Project: http://www.3gpp.org.
IBM WebSphere Telecom Web Services Server. http://www-306.ibm.com/software/pervasive/serviceserver.
OSA Phase 4—Parlay 6.0, http://portal.etsi.org/docbox/TISPAN/Open/OSA/Parlay60.html.
Osa—Parlay X 3.0, http://portal.etsi.org/docbox/TISPAN/Open/OSA/ParlayX30.html.
O'Reilly—What is Web 2.0, http://www.oreillynet.com/pub/a/oreilly/tim/news/2005/09/30/what-is-web-20.html.

(Continued)

*Primary Examiner* — David Lazaro
*Assistant Examiner* — Charles Murphy
(74) *Attorney, Agent, or Firm* — Ryan, Mason & Lewis, LLP

(57) ABSTRACT

Techniques for coordinating an on-demand communication-based mashup service are provided. The techniques include resolving a dynamic context of a receiver, configuring a communication service with at least one parameter of the dynamic context of the receiver, and coordinating the communication service dynamically at run-time based on the at least one parameter of the dynamic context of the receiver, wherein the communication service is composed in a mashup environment. Techniques are also provided for providing a customizable service to a user.

25 Claims, 8 Drawing Sheets

OTHER PUBLICATIONS

Orkut, https://www.google.com/accounts/ServiceLogin?service=orkut&hl=en-US&rm=false&continue=http%3A%2F%2Fwww.orkut.com%2FRedirLogin.aspx%3Fmsg%3D0%26page%3Dhttp%253A%252F%252F.

Myspace, http://www.myspace.com/.

Popular Science Blog—Tracking Your Friends Through Their Cellphones, http://popsci.typepad.com/popsci/2007/07/tracking-your-f.html.

Drools, http://www.jboss.org/drools/.

TeleStrategies' Telco + Web 2.0 Service Creation, http://www.telestrategies.com/telco2/.

J. Rosenberg, et al., Best Current Practices for Third Party Call Control (3pcc) in the Session Initiation Protocol (SIP), Network Working Group, Apr. 2004, http://www.ietf.org/rfc/rfc3725.txt.

Dipanjan Chakraborty, et al., BusinessFinder: Harnessing Presence to Enable Live Yellow Pages for Small, Medium and Micro Mobile Businesses, 10 pages.

J. Rosenberg, et al., SIP: Session Initiation Protocol, Network Working Group, RFC 3261—SIP: Session Initiation Protocol, pp. 1-265, http://tools.ietf.org/html/rfc3216.

Java Community Process, JSR 116: SIP Servlet API, pp. 1-4, http//jcp.org/en/jsr/detail?id=116.

Web21C SDK, http://web21c.bt.com/.

* cited by examiner

METHOD FOR ENABLING ON-DEMAND COMMUNICATION SERVICES

FIELD OF THE INVENTION

The present invention generally relates to information technology, and, more particularly, to communication services.

BACKGROUND OF THE INVENTION

The emerging paradigm of Web 2.0 is transforming the traditional internet from a mass media to a social media mode. The fundamental communication premise in social to media mode is one-to-one communication. Hence, technologies enabling such communication paradigms are gaining prominence. However, text or data has been the primary mode of communication in the majority of existing portals. Historically, voice has proved to be the most successful medium for one-to-one communications. However, existing Web 2.0 applications are missing an important medium of communication, and would greatly benefit from an effort made towards enabling them with this mode of communication.

Existing approaches for bringing voice communication capabilities to web applications can include, for example, the following Initially, SS7-based intelligent networking (IN) services were integrated with internet applications and several smart services (such as, for example, click-to-dial and interactive voice response (IVR)-based applications) were developed. The subsequent emergence of voice over internet protocol (VoIP) technology with session initiation protocol (SIP) as the out-of-band signaling protocol enabled these services to be available in the internet protocol (IP) domain. This, in turn, facilitated development of advanced applications beyond the basic click-to-dial, where it was possible to provide the call-control to the application developers.

Although SIP provides flexibility, VoIP applications alone cannot leverage the full benefits that a cellular operator offers (for example, mobility, quality of service (QoS), billing etc.), which makes them indispensable in building advanced services. In fact, it is a non-trivial issue to make these services available to application developers The IP multimedia subsystem (IMS) was designed to address this issue. IMS provides assistance and control for multimedia sessions established between two communicating peers.

IMS defines a functional element called the application server (AS) in its service architecture to provide value-added services. The AS represents capabilities, which are system components used presumably with other components (for example, content servers) to implement a service to the user. For example, SIP is the IMS service control (ISC) interface used between the core network call session control function (CSCF) and the service capabilities implemented in the AS.

However, a problem in the standardization lies in the interaction of these capabilities. The 3rd generation partnership project (3GPP) standard only loosely defines the functional element called the service capability interaction manager (SCIM) that handles the interaction between several capabilities. The implementation details are left to the vendors. SCIM, however, was never designed to bring the IMS capabilities to the mashup domain. For example, in a mashup environment, SCIM needs to handle protocol level mediation between SIP and SOAP to merge the capabilities from two disparate domains of web and/or service-oriented architecture (SOA) services and IMS. To be effective, telecom communication services should be customizable at run-time based on various types of contextual information. As such, there is a need for an enhanced SCIM (e-SCIM) and an architectural solution that implements the e-SCIM functionalities.

Existing approaches include, for example, a web based service creation environment that enables users to statically configure telecom service logic and scripts call logic using a web interface. However, such an approach does not consider the mashup capability defined in the Web 2.0 paradigm, and does not cover the run-time configuration, execution and rule-based mediation of telecom services with dynamic contexts generated during the run-time.

Other existing approaches can include, for example, routing a communication flow based on a dynamic context, and the representation of a response generated by a server in a client machine based on the dynamic context of the latter. But, however, such approaches do not deal with run-time configuration, mashup and rule-based execution of telecom services (for example, call notification services).

Additionally, existing approaches can include the selection of web services by a service provider based on several dynamic run-time parameters, software architecture for selection, configuration and composition of software based services, and a servlet based architecture for selection, configuration and composition of services using user inputs. However, such approaches do not deal with the rule-based run-time execution and mediation of telecom services and the user oriented dynamic context generation and selection of services.

Other existing approaches also do not, for example, perform rule-based run-time mediation of telecom services, not do existing approaches cover the configuration of component services with dynamic contexts and the subsequent rule-based run-time mediation of services during execution.

The emerging Web 2.0 marketplace presents an important opportunity for telecom operators to sell their own capabilities and content as services. Operators have a wealth of content associated with their network as well as core network enable is (for example, call control, presence and messaging) that could serve as potential new revenue streams in a Web 2.0 world. Moreover, there is an increasing need for operators to make both core and value-added functions reusable and mashable. To this end, operators are gradually embracing the IP multimedia subsystem (IMS) and looking at developing the next-generation of SIP-based applications that can be mashed up in innovative ways.

However, to do so, IMS/SIP-based services need to be empowered with the necessary coordination capabilities required in a mashup environment. This, in turn, implies protocol-level control to be tendered to the mashup developer, an issue that has not been sufficiently addressed by existing approaches. As such, there exists a need for middleware support in facilitating the coordination of telecom mashups, as well an architecture that provides the necessary run-time control and mediation in an IMS-based operator network.

Existing web based communication services are assigned to a static context and are not configurable, controllable nor compose-able by end users on demand. Hence a solution is required to enable on-demand selection, configuration, and composition of communication services, with dynamic context of communicating agents, enabled in a Web 2.0 paradigm.

SUMMARY OF THE INVENTION

Principles of the present invention provide techniques for enabling on-demand communication services.

An exemplary method (which may be computer-implemented) for coordinating an on-demand communication-based mashup service, according to one aspect of the invention, can include steps of resolving a dynamic context of a receivers configuring a communication service with at least one parameter of the dynamic context of the receivers and coordinating the communication service dynamically at run-time based on the at least one parameter of the dynamic context of the receivers wherein the communication service is composed in a mashup environment.

In an embodiment of the invention, an exemplary method for providing a customizable service to a user can include the steps of facilitating a user to locate at least one vendor based on at least one attribute, enabling the user to select a vendor based on the at least one attribute, facilitating an interaction between the user and the vendor, and providing a dynamic, presence-based matchmaking service between the user and a vendor.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof which is to be read in connection with the accompanying drawings.

DETAILED DESCRIPTION OF PREFERRED EMBODIMENTS

Principles of the present invention include techniques to enable on-demand, customizable communication services in telecom mashups. One or more embodiments of the inventions include run-time orchestration (based on contextual information) in telecom mashups.

As noted above, the World Wide Web (WWW) is undergoing a fundamental paradigm shift, which is often referred to as Web 2.0. Web 2.0 applications are delivered through Web browsers and the applications are responsive to users through rich application interfaces, often including pre-built application components or service widgets. Mashups are the essence of such applications. A mashup is a website or application that combines content from more than one source into an integrated experience. In existing approaches, the primary focus of the mashup services has been the amalgamation of data from different applications. However, the architecture for data-based mashups in existing approaches, as detailed above, is insufficient to bring telecom services in to the mashup domain. IMS has facilitated this process by defining a unified telecom architecture that can be inducted into the mashup paradigm. IMS recommends SIP AS implementing the application logic that analyzes SIP messages generated by a particular network service and takes necessary actions. This protocol-based service development in IMS enables rich services to be developed, which goes beyond the basic legacy services, in terms of capabilities However, there are a number of challenges still to be addressed.

A salient feature of Web 2.0 is to enable long-tailed applications by harnessing the collective intelligence of a wider base of developers empowered with lightweight API-based programming tools.

Figure 1:
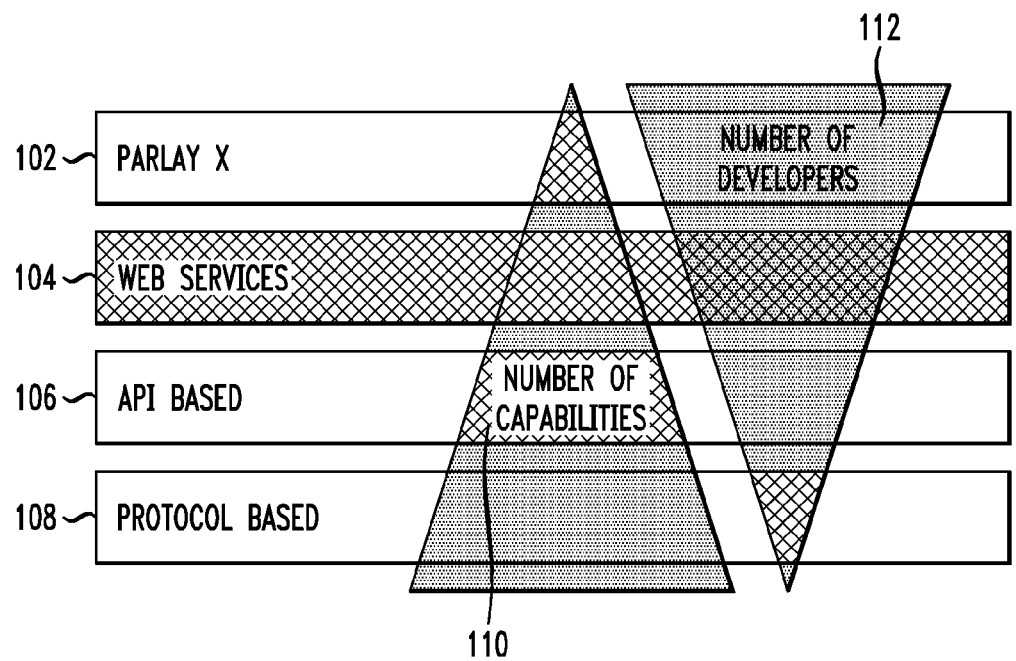
FIG. 1 is a diagram illustrating a trade-off between the number of developers and number of capabilities with service abstraction, according to an embodiment of the present invention.

FIG. 1 is a diagram illustrating a trade-off between the number of developers and number of capabilities with service abstraction, according to an embodiment of the present invention. By way of illustration, FIG. 1 depicts the elements of Parlay X 102, web services 104, application programming interface (API) based items 106, protocol based items 108, number of capabilities 110 and number of developers 112.

As shown in FIG. 1, the number of developers increases significantly when services are available as web services, but this also takes its toll on the service capabilities. Capabilities increase when services are developed based on the protocols. Examples of such services can include those which are capable of being customized with rich, dynamic contextual information during run-time. Note that telecom services exposed as web services (for example, Parlay X) often lack in terms of capabilities offered by SIP. For example, Parlay X services do not expose events such as provisional response to a call to the developer, which could be instrumental in introducing asyncronization, a key feature of mashups. Moreover, Parlay X APIs are oblivious to many non-functional requirements of service development, which require protocol-based support. To this end, it would be advantageous to have middleware-based control and coordination that can provide the flexibility of protocol-based IMS application development, as well as the simplicity of web services to the mashup developers.

The IMS reference architecture segregates the service, control and transport layers. IMS, however, does not deal with the transport directly, but provides a mechanism to converge networks based on a broad range of different wireless or fixed access technologies. IMS uses SIP for the control of sessions SIP is an internet signaling protocol, which along with a suite of internet engineering task force (IETF) designed multimedia transport protocols such as real-time transport protocol (RIP), real-time control protocol (RTCP), provides complete support for multimedia applications. The main elements in this signaling plane are the SIP proxies or servers, known as the call session control function (CSCF) servers.

Figure 2:
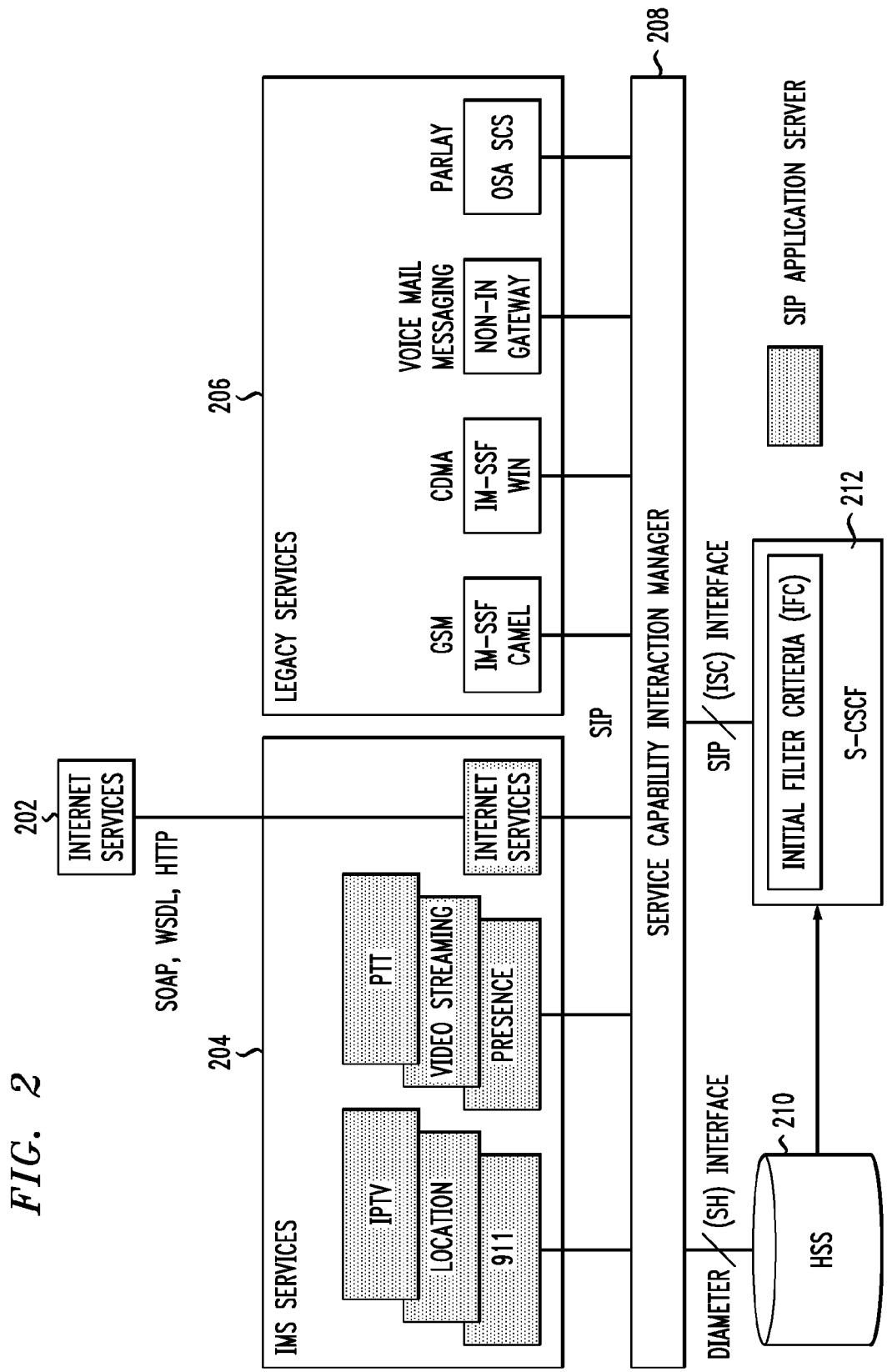
FIG. 2 is a diagram illustrating IMS service architecture, according to an embodiment of the present invention.

FIG. 2 is a diagram illustrating IMS service architecture, according to an embodiment of the present invention. By way of illustration, FIG. 2 depicts the elements of internet service 202, IMS services 204, legacy services 206, service capability interaction manager 208, home subscriber server (HSS) 210 and serving-CSCF (S-CSCF) 212.

As shown in FIG. 2, the service layer is completely decoupled from the control layer and the two interact via the IP multimedia service control (ISC) interface. This provides flexibility to new service logic without affecting the CSCF functions in the network layer. To interact with these proxies, the user devices must implement the functionality of a SIP user agent (SIP-UA). The CSCs handle all of the SIP session signaling, but they do not take part, nor are they on the path of the application data. The IMS proxies are hierarchically divided into two categories, the proxy-CSCFs (P-CSCFs), which are the IMS contact points for the SIP-user agents (SIPUAs), and the serving-CSCF (S-CSCF), which is the proxy server controlling the session.

Service invocation in the IMS can be done by a trigger mechanism. The serving-CSCF (S-CSCF) obtains the initial filter criteria (IFC) from the HSS for a registered subscriber. When the subscriber sends an SIP command (for example, INVITE) for the multimedia session that one is requesting, the S-CSCF cascades through the IFC and sends the invocation to the necessary application servers based on priority. While the S-CSCF has been enabled to invoke multiple sessions in a sequence, it is assumed that once the control is handed over to an application server, it will be the responsibility of the application server to coordinate with other services. However, to implement a service that requires combinational services, such as those created by mashups, the control must shift between the two applications dynamically under the direction of the user. This also exposes the issue that the IFC can cascade through services, but does not allow interleaving on a dynamic nature.

The services are also known as capabilities of the network system components As noted above, it is the responsibility of the AS to coordinate diverse capabilities in the network and handle the orchestration of the interaction between them. During the initial designing phase of the IMS, the latter functionality was assigned to a functional unit called the SCIM. The implementation of the SCIM has been left up to the vendors to suite their individual application requirements. Such a loose definition of SCIM, and the lack of standard definition of the capabilities that should interact, make the design of a generalized SCIM challenging.

Assuming that the most basic instantiation of an SCIM is an AS that orchestrates multiple AS's, one can extend the functionality of SCIM to define what is referred to herein as an enhanced SCIM (e-SCIM) As described herein, e-SCIM can be instrumental in taking care of additional requirements such as, for example, user-driven service configuration with dynamic contextual information, imposed by new paradigms such as Web 2.0 As such, e-SCIM can behave as a service blender that manages the dynamic interaction between service capabilities of IMS network expressed as SOAP-based services. It can also handle the real-time mediation between SIP and SOAP messages. In this way, e-SCIM facilitates protocol-based service development. The e-SCIM implementing the above functionality can form the core of the middleware identified earlier, and described in further detail below.

Figure 3:
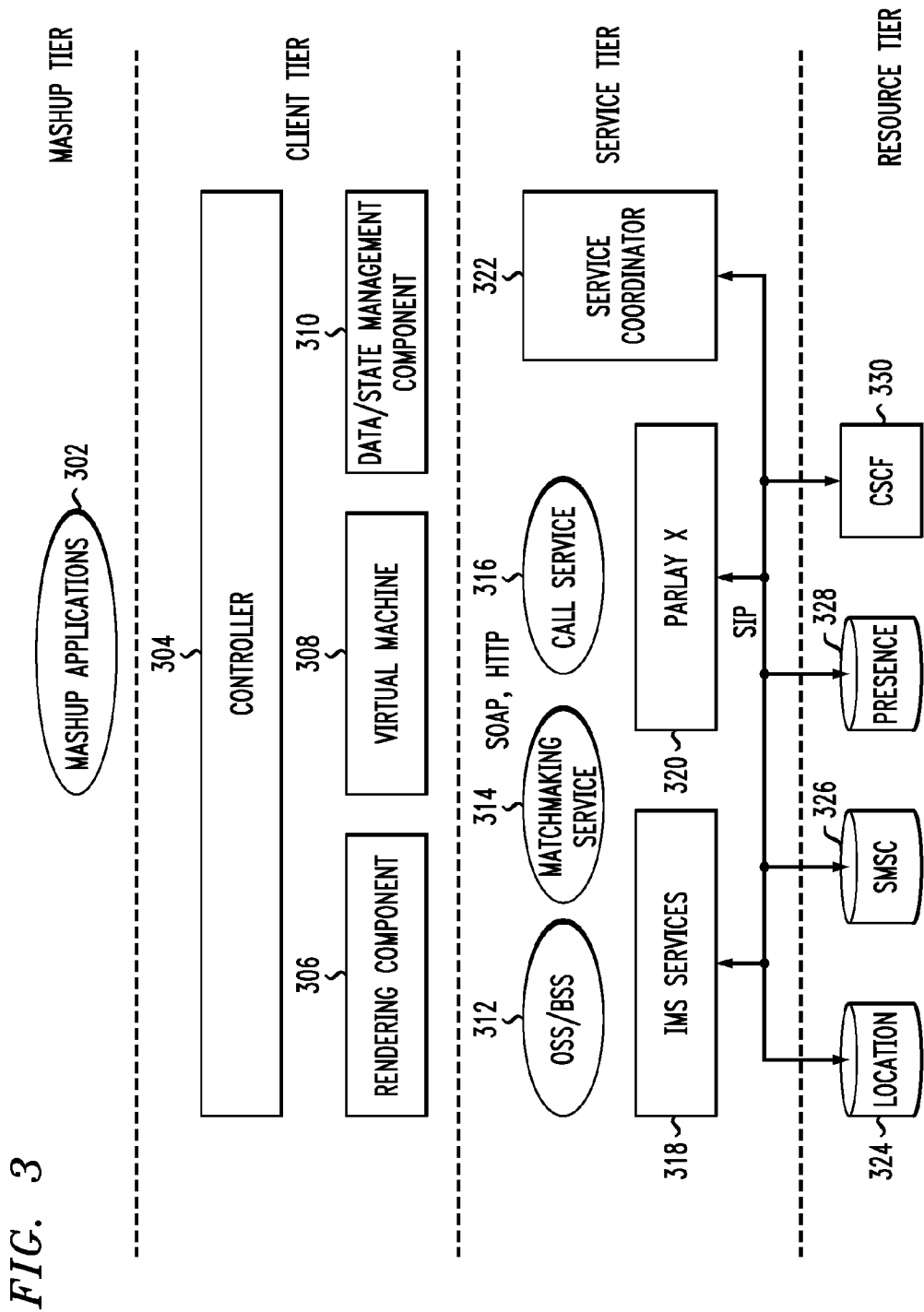
FIG. 3 is a diagram illustrating system architecture, according to an embodiment of the present invention.

FIG. 3 is a diagram illustrating system architecture, according to an embodiment of the present invention. By way of illustration, FIG. 3 depicts a mashup tier, which includes mashup applications 302. Also, FIG. 3 depicts a client tier, which includes a controller 304, a rendering component 306, a virtual machine 308 and a data and/or state management component 310. FIG. 3 additionally depicts a service tier, which includes operational support system/business support system (OSS/BSS) 312, a matchmaking service 314, a call service 316, IMS services 318, Parlay X 320 and a service coordinator 322. Further, FIG. 3 depicts a resource tier, which includes location 324, a short message service center (SMSC) 326, presence 328 and CSCF 330.

FIG. 3 depicts an exemplary architecture. The four main layers of the architecture are the resource tier, the service tier, the client tier, and the mashup tier. IMS service architecture described earlier can form the core of the service and resource tiers.

The resource tier includes all the network elements that give control to the various network level services such as, for example, call, location, presence, SMS, etc. IMS assumes that all of these services are SIP-based and makes them available through the IMS service control (ISC) interface.

The service tier provides a service abstraction of the network level services. This tier includes a high level Parlay X web service interface for legacy network services to third parties. To integrate the services developed with Parlay/OSA APIs with other enterprise processes (for example, OSS/BSS), the APIs are enhanced to adopt a SOA-based model and exposed as Parlay X web services Parlay X provides, to all third patty application developers, web services-based access to legacy telecom applications including third party call, call handling, billing, multimedia streaming and control, messaging, etc. Apart from the Parlay X services, the service tier can also include all other IMS services that are deployed in the AS's and are exposed as web services. This layer can also act as the placeholder for future IMS-based services.

One component of the service tier is the service coordinator (SC). The SC, along with the client tier; implements the e-SCIM functionality discussed above. Illustrative functions of the SC can include, for example, registration of services, invocation of services, rule-based coordination of services (both functional and enterprise rules), and coordination of services through dynamic user interaction.

While mashing up an application, the controller (in the client tier) coordinates several services ranging from web services to SIP-based IMS services that implement diverse capabilities in the network. A service that wants to be a part of the coordinated service contacts the SC and asks it to create a coordination context. The SC will create a new instance of the coordination context and hand the context over to the requesting participant service(s). A coordination context is a data-structure that contains an activity identifier. The SC can also pass the coordination context to the client tier for further correspondence with the mashup application. Each participant service will further ask the registration service of the SC to register its role in the coordinated activity. The registration service registers the role of the participating service in the activity. The participating service can, for example, propagate this context instance to other services that would like to take part in the same activity.

The SC coordinates various activities that are invoked when certain events happen in the ISC layer. The SC is equipped with a service rule repository and a rules engine, which help it to take actions or invoke the appropriate coordinated activity against the events of interest captured from the ISC layer using the IFC. The rules maintain the mapping between the ISC events and the corresponding activity context to invoke the designated activity. They can also implement the appropriate mode of invocation of the coordinated activities. For example, if a web service-based billing is invoked based on a SIP-based call, the rules implement the appropriate SOAP-based invocation to the billing services. This coordination activity of the SC realizes the SIP-SOAP mediation required for rich service interaction and user-driven service customization, according to the Web 2.0 paradigm.

Illustrative functional components of the client tier in the middleware and their respective functionalities can include, for example, the following. A controller forms the core application master logic and processing. A virtual machine provides the run-time environment launched and managed by a controller. A rendering component defines the behavior for the graphical user interface (GUI) and media integration. Also, a data and/or state management component keeps track of transformations, state synchronizations, transitions, and state change event generation during lifecycle of objects such as, for example, widgets.

The client tier can provide the tools necessary for developing the mashup applications using resources from service tier. The controller does the job of sequencing the various services constituting the mashup application In mashups, user interaction is very important and the controller, with the help of the virtual machine and the rendering component, provides an interactive GUI to enable the user interaction. The data or state management component is responsible for all the book-keeping functionalities required to relate the state transitions or transformations happening at the mashup tier and the service tier. Additionally, the mashup tier includes the mashup applications developed with support of the underlying tiers.

An illustrative embodiment of the invention can include, for example, a telecom mashup application referred to herein as a call-a-cab scenario. By way of example, assume Linda is a tourist in New Delhi, India. After a tour of the historical India Gate, she wants to take a cab back to her hotel. However, Linda is unfamiliar with the city. Using her GPRS-enabled phone, she logs on to the call-a-cab portal and requests a cab. The call-a-cab portal uses Linda's mobile phone number to find all available cabs in the vicinity of Linda's location and displays them on a map. Each of the cabs is marked with a plurality of attributes such as, for example, its estimated time of arrival (ETA), customer satisfaction ranking, etc. Linda then selects a cab according to her preference and places a call to the cab driver using a GUI widget (call and/or SMS) embedded in the portal. Before the call is connected, Linda is intimated of the premium rate at which she will be charged for the service. The cab driver (for example, John) picks up the call, and Linda notifies him of her exact location and waits for the cab. John then starts driving towards Linda's location, and when it is in the vicinity, an SMS notification is sent to Linda's mobile number along with a feedback request asking her to rate her experience with the cab driver.

The call-a-cab service can be a mashup of three core components such as, for example, Google Maps, BusinessFinder matchmaking service, and SIP-based $3^{rd}$ Party Call Control (3PCC) Service. As described above, one or more embodiments of the invention include a call-a-cab portal Linda logs on using her mobile number and searches for a cab. Business-Finder extracts the current location of Linda and matches her request to a list of available cabs that are located in the vicinity. The cabs are displayed on Google Maps. Further, clicking on a cab driver returns real-time contextual information (for example, ETA). Linda can either call or SMS the driver. In the case she decides to call, she is intimated of the premium rate at which she will be charged. Also, when the call is terminated ("End Call") by Linda, the portal sends a "Thank You" message back to Linda.

Figure 4:
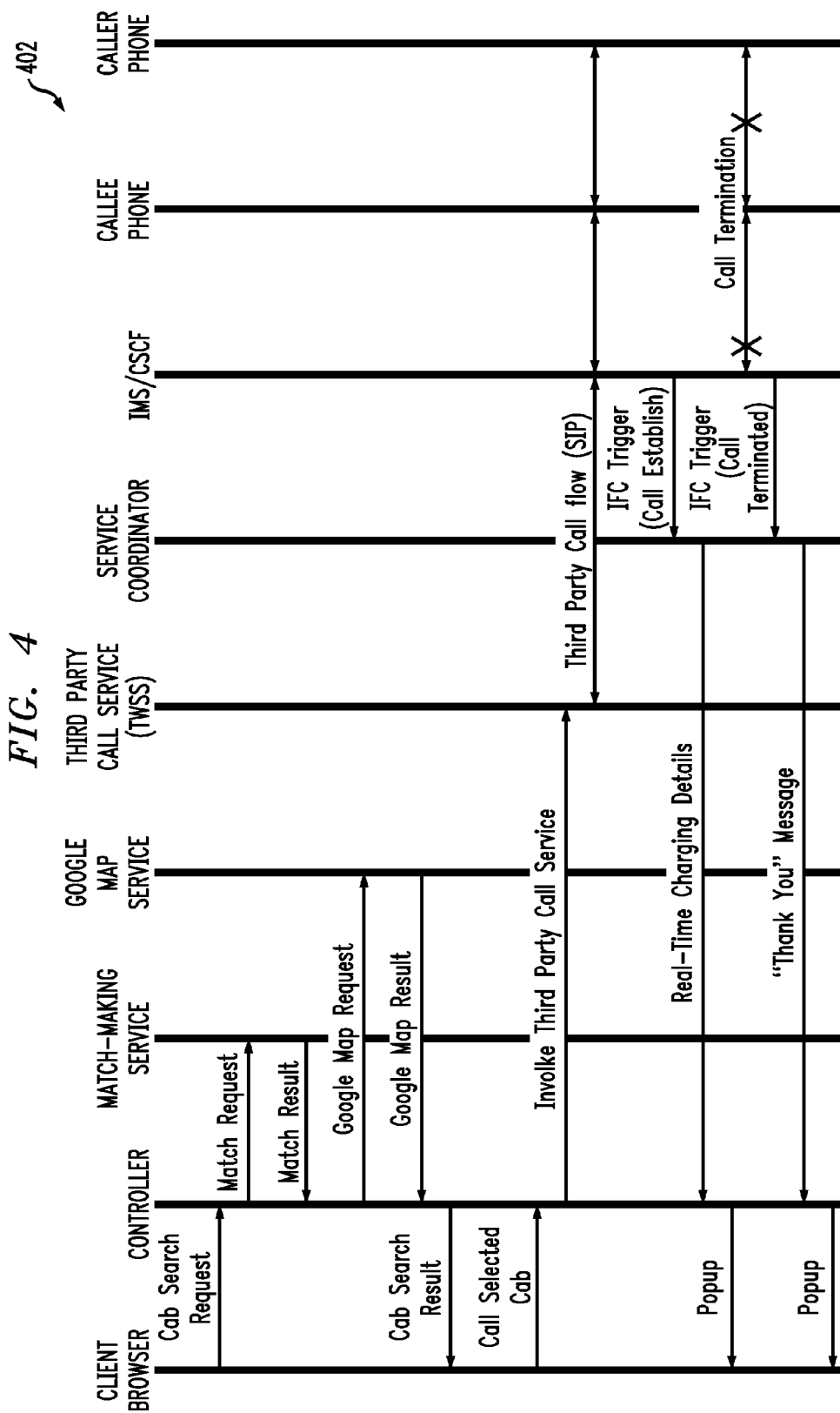
FIG. 4 is a diagram illustrating execution flow for a call-a-cab application, according to an embodiment of the present invention.
Figure 5:
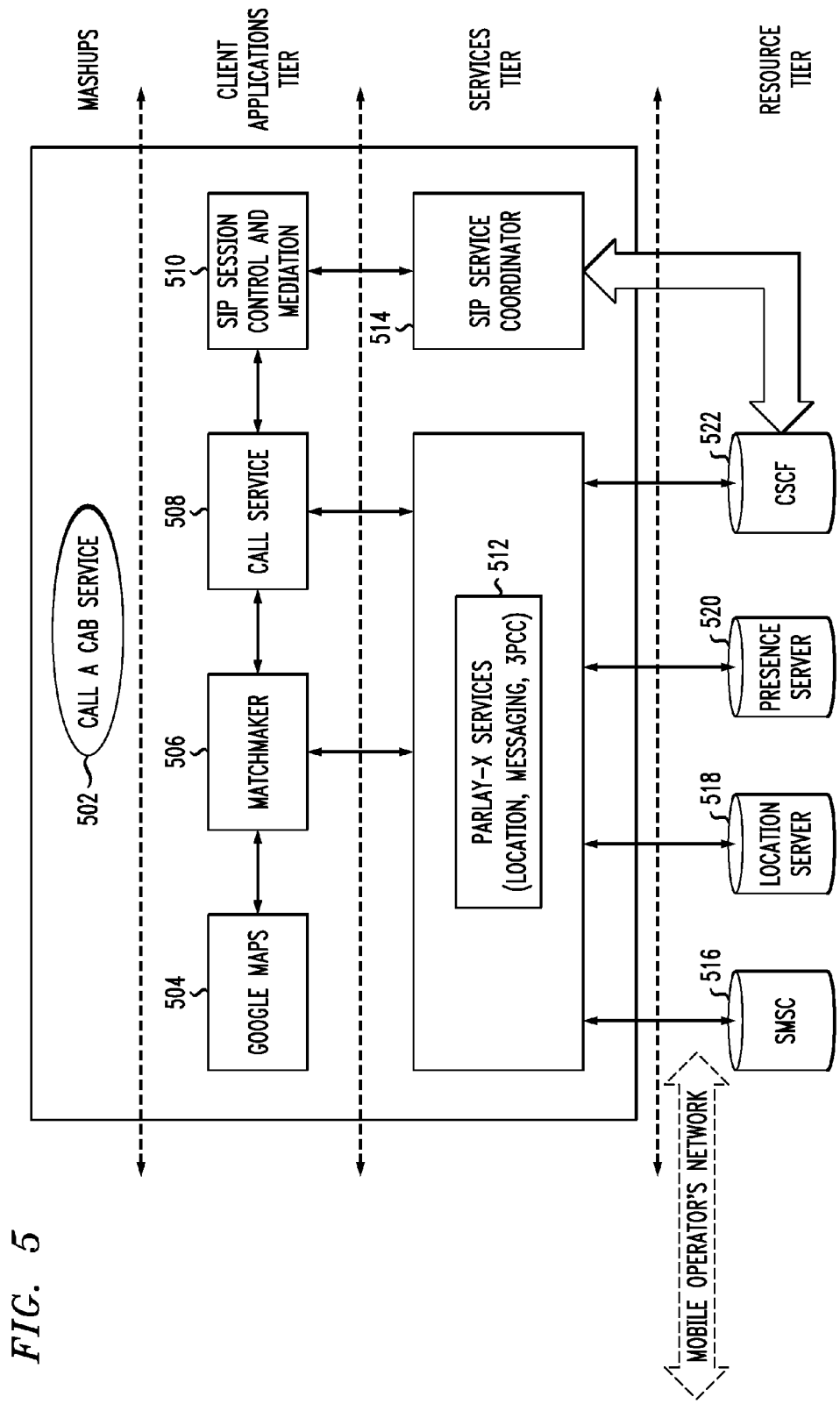
FIG. 5 is a diagram illustrating system architecture for a call-a-cab application, according to an embodiment of the present invention.

FIG. 4 is a diagram illustrating execution flow 402 for a call-a-cab application, according to an embodiment of the present invention. FIG. 5 is a diagram illustrating system architecture for a call-a-cab application, according to an embodiment of the present invention. By way of illustration, FIG. 5 depicts the elements of a call-a-cab-service 502, Google Maps 504, a matchmaker 506, a call service 508, SIP session control and mediation 510, Parlay X services 512, an SIP service coordinator 514, SMSC 516, a location server 518, a presence server 520 and CSCF 522.

An exemplary execution flow for the call-a-cab application, as well as the role played by the different components of the mashup architecture, is depicted in FIG. 4. The virtual machine and rendering function of the client tier provide the GUI support for the application. The client tier controller, on getting an asynchronous request for a cab from the GUI, forwards the request to the BusinessFinder (BF) matchmaking service. The result is a list of available cabs with attributes such as name of the driver, ETA, etc. This information is forwarded to the Google Map service, which renders a map displaying the results and sends it back to the application via the controller. Once Linda clicks to call the driver, the controller invokes the 3PCC service, provided, for example, by IBM. Telecom Web Services Server™, with the mobile numbers of Linda and the cab driver as parameters. Note that, whenever such an invocation is made to a back-end service, the client tier (that is, data and/or state management component in it) maintains book-keeping information to correlate a client service session with a back-end service session.

This aspect plays an advantageous role in the service coordination between the client mashup and the SIP service. The illustrated implementation assumes that both the calling and called parties are equipped with an SIP terminal. Such terminals could as well be a SIP soft-phone embedded within the browser application of the parties. Once the SIP session starts, the service coordinator (SC) comes into play though the IFC configured in the CSCF servers. For example, in this case, the $3^{rd}$ party call context (including the SIP URI for 3PCC) can be used as the filtering criteria (that is, IFC trigger) to filter appropriate SIP messages and trigger corresponding SC actions.

The SC plays the role of bringing capabilities from both Web 2.0 and telecom domains, based on the rules specified in the SC rules engine. The capabilities in the Web 2.0 domain can be managed by the controller in the client tier along with SC rules in the service tier. The telecom capabilities can be invoked by the SC, for example, in the same way as described in the IMS standards.

The SC can be configured with rules specifying, for example, the actions of intimating the user of premium charging for the service, starting charging once the call gets connected, and with the termination of the call, committing the negotiated charge is and sending a "Thank You" message.

Formally, these rules can be represented as human-readable event-condition-action (ECA) type if-then-else rules, where each of the rules includes a condition clause and an action clause (that is, an activity context) that is executed when the condition is met. In the implementation described above, the open source rules engine, Drools, has been used to implement the rules. Therefore, the above rules can be represented as follows:

rule "Rule 1" when Call_Initiated then intimate user of premium charging end;
rule "Rule 2" when Call_Established then start real-time charging functions end;

rule "Rule 3" when Call_Terminates then commit the charges for the service and present "Thank You" message end.

The above rules, however, deal with a normal case of call set up. The SC can additionally have rules on how to handle exceptions. The following two rules, for example, show possible actions that could be taken in case the call setup fails.

rule "Failure" when Call_Fails (not reachable, not found) then present a list of next available cab driver with necessary credentials end;

rule "Provisional" when Call_Fails_Provisionally (driver busy, driver not picking up the call) then present an option for waiting for sometime or calling another driver end.

Figure 6:
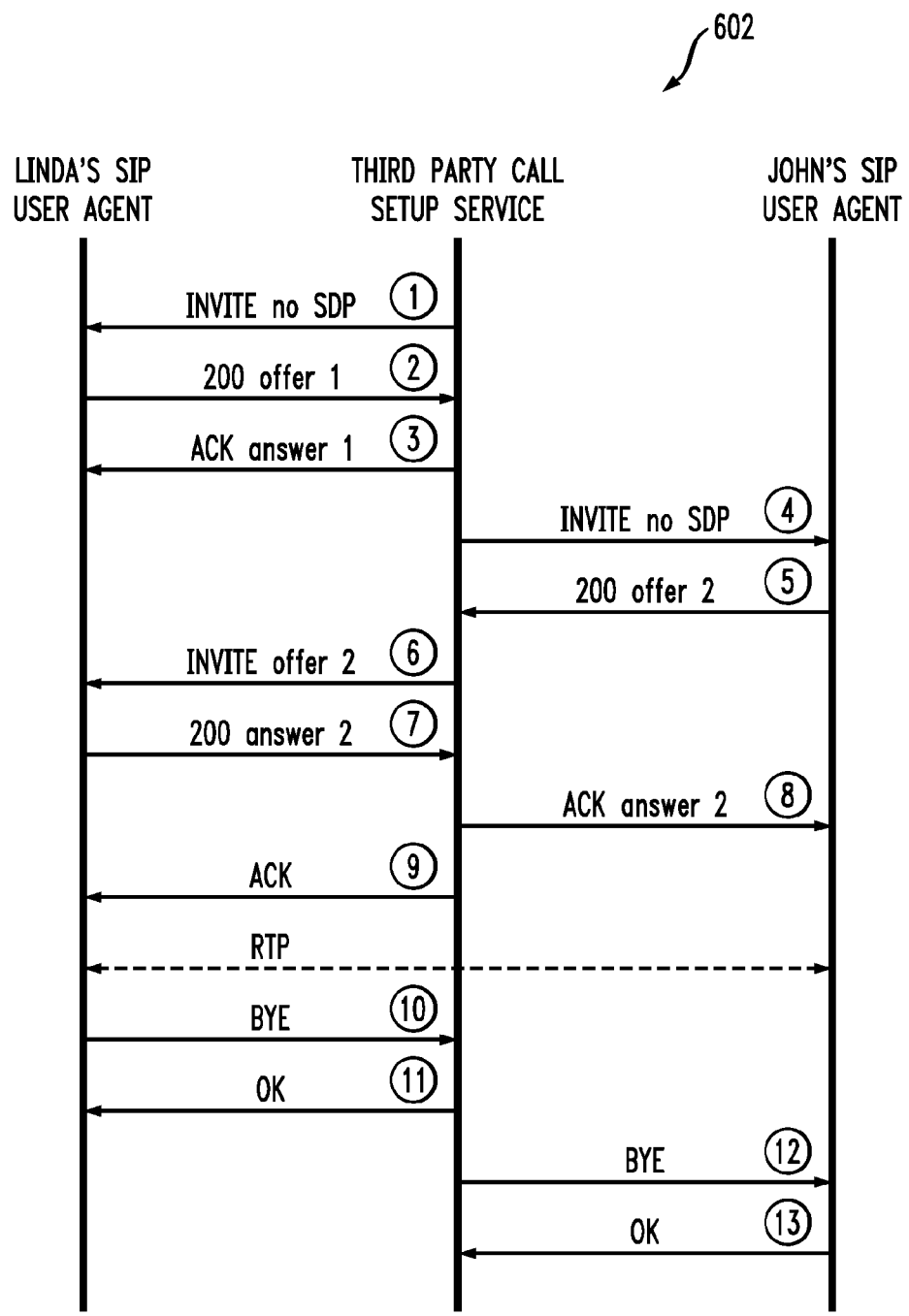
FIG. 6 is a diagram illustrating a call flow for third party call setup, according to an embodiment of the present invention.

The conditions in the SC files can be based on SIP events that take place in the ISC layer during the $3^{rd}$ party call setup. FIG. 6 is a diagram illustrating a call flow 602 for third party call setup, according to an embodiment of the present invention.

FIG. 6 illustrates an SIP call flow for the call setup between Linda and John's devices. Basic call flow for the $3^{rd}$ party call can be, for example, defined by RFC 3725, call flow III (a third party call setup). The service uses two SIP servlets to control the third party call back-to-back user agent (B2bUA) implementation. The first servlet handles the initial part of the call (Messages 1, 2, and 3). Once the ACK (that is, the acknowledgment code) is received from the initial steps, the SIP control is passed to the second servlet which handles the rest of the call flow.

The first rule condition corresponds to the INVITE message (Message 1 in FIG. 6) intercepted through the IFC interface in the CSCF server. The second rule condition gets satisfied when the call is established, that is, the ACK message (Messages 9 in FIG. 6) is sent to Linda's SIP terminal. Also, the condition in the third rule is met when the call is terminated that is, the OK (Message 13 in FIG. 6) message is sent to John's terminal in response to the BYE messages.

The SC leverages the client tier and other services in the service tier to implement the actions (that is, activity contexts) in the rules engine. The SC acts with the events in the call and/or sends messages to the controller of the client tier, which then makes use of the virtual machine and the rendering component of the client tier to get the appropriate callback objects and send messages (for example, pop-ups) to the client browser. The controller takes help of the data and/or storage management component to find reference to the callback objects corresponding to the appropriate mashup service session.

The SC sends a pop-up to the client application with the charging details when Rule 1 is triggered. With triggering of Rule 2, the SC invokes the charging service from the service tier and starts real-time charging. Rule 3 makes the SC invoke the charging service again, this time with appropriate parameters to commit the charge of the call, and a client pop-up with a "Thank You" message.

As described herein, one or more embodiments of the present invention include communication services made available as part of a mashup service delivery platform, and customizable based on contextual information (for example, the required architectural solution along with run-time support for mediation (interaction and control)) between the mashup services and the communication services Additionally, the techniques described herein include on-demand selection, configuration, and composition of communication services, with dynamic context of communicating agents, enabled in a Web 2.0 paradigm. One or more embodiments of the invention may also include a dynamic, contextual communication service widget in a Web 2.0 portal.

Also, one or mote embodiments of the present invention include an apparatus that enables service-oriented capabilities during the delivery of IMS-based multimedia services, by way of providing fine-grained, rule-based, run-time mediation and service coordination (the apparatus being referred to above as a Service Coordinator) between the application session and the network-level multimedia session. As described herein, one or more embodiments of the invention also include an apparatus that further extends run-time coordination to the execution of telecom mashups by deriving dynamic contextual attributes from the application (mashup) domain and/or the network domain to orchestrate and customize the mashup service. Additionally, the techniques described herein can include an apparatus that includes a plurality of multimedia services (for example, IMS services, legacy telecom services) that can be delivered with fine-grained, service-oriented support and run-time mediation.

Principles of the present invention can enable value-added services for a mobile service provider. Any application benefited by dynamic and contextual communication services can fall under this category.

As described above, call-a-cab is an advanced presence-driven location-based service solution providing enterprise services ability to establish a connection to consumers quickly. Call-a-cab provides an opportunity for ad-hoc individual vendors (for example, cab drivers, plumbers, electricians, etc.) to gain value-added services revenue with on-demand appointment scheduling. Also, call-a-cab allows a user to find a vendor based on several attributes (for example, location, earliest availability, reputation) and interact and/or communicate with the vendor. Call-a-cab can use, for example, IBM BusinessFinder matchmaking technology along with Google Maps, and TWSS Parlay-X services (such as, for example, 3PCCC) to provide a dynamic, presence-based, matchmaking solution. The service is an example of a mashup service that can be built on Web 2.0 technologies to provide a rich service customizable service experience to the users.

Figure 7:
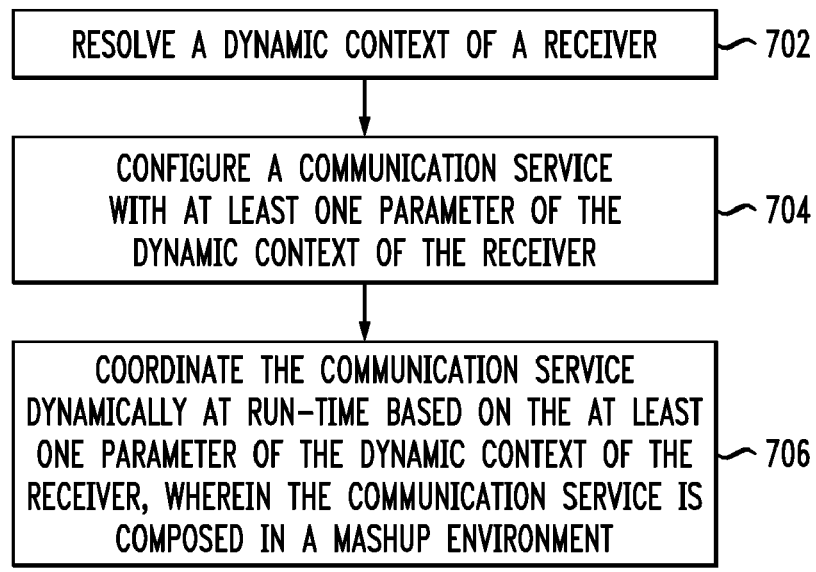
FIG. 7 is a flow diagram illustrating techniques for coordinating an on-demand communication-based mashup service, according to an embodiment of the present invention.

FIG. 7 is a flow diagram illustrating techniques for coordinating an on-demand communication-based mashup service, according to an embodiment of the present invention. Step 702 includes resolving a dynamic context of a receiver. The dynamic context can include at least one attribute including, for example, a specification of available device context, a network context, a location attribute, and a specification of an availability attribute indicating willingness and/or ability of the receiver. Step 704 includes configuring a communication service with at least one parameter of the dynamic context of the receiver. Step 706 includes coordinating the communication service dynamically at tun-time based on the at least one parameter of the dynamic context of the receiver, wherein the communication service is composed in a mashup environment.

The techniques depicted in FIG. 7 can include at least one user, wherein the user is provided with a plurality of configurable communication services. Also, at least one telecommunications service provider can expose services as configurable web services. Telecommunications service providers can also tender fine-grained control and coordination of a communication session to a user, as well as provide mediated control of a communication session via at least one web based tool, wherein the mediated control can include, for example, run-time support for mediation between communication service semantics and web service semantics.

Also, in the techniques depicted in FIG. 7, each of at least one interacting agent can be represented with a virtual identity, and each dynamic context can be associated with a virtual communicating agent. Further, the virtual identity of each interacting agent can be used to select, configure, compose and access at least one communication service.

Figure 8:
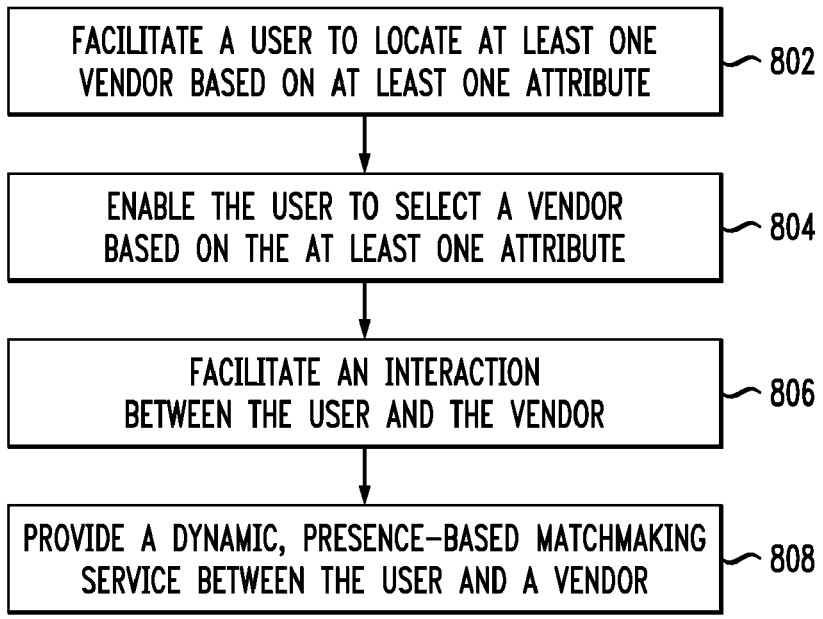
FIG. 8 is a flow diagram illustrating techniques for providing a customizable service to a user, according to an embodiment of the present invention.

FIG. 8 is a flow diagram illustrating techniques for providing a customizable service to a user, according to an embodiment of the present invention. Step 802 includes facilitating a user to locate at least one vendor based on at least one attribute. The attributes can include, for example, estimated time of arrival, customer satisfaction tanking, name of vendor, location, earliest availability and/or reputation of vendor. Step 804 includes enabling the user to select a vendor based on the at least one attribute. Step 806 includes facilitating an interaction between the user and the vendor. The interaction between the user and the vendor can include, for example, a telephone call and/or a short message service (SMS) communication Step 808 includes providing a dynamic, presence-based matchmaking service between the user and a vendor.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 9:
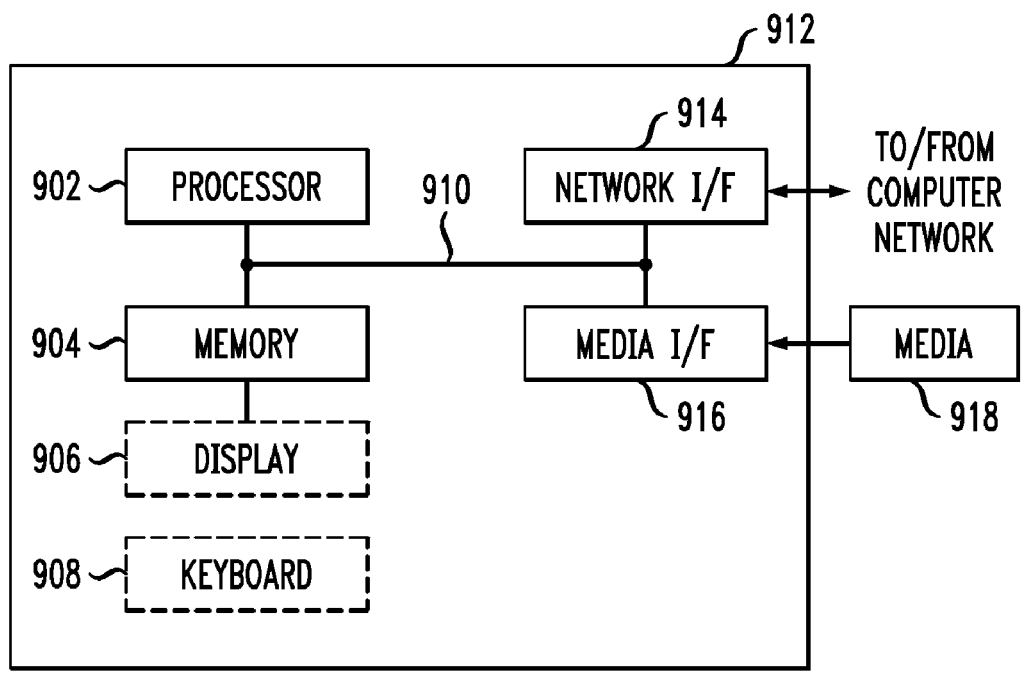
FIG. 9 is a system diagram of an exemplary computer system on which at least one embodiment of the present invention can be implemented.

At present, it is believed that the preferred implementation will make substantial use of software running on a general-purpose computer or workstation. With reference to FIG. 9, such an implementation might employ, for example, a processor 902, a memory 904, and an input and/or output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 902, memory 904, and input and/or output interface such as display 906 and keyboard 908 can be interconnected, for example, via bus 910 as part of a data processing unit 912 Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computers software including instructions or code for performing the methodologies of the invention, as described herein, may be stored in one or mole of the associated memory devices (for example, ROM, fixed or removable memory) and, when ready to be utilized, loaded in part or in whole (for example, into RAM) and executed by a CPU Such software could include, but is not limited to, firmware, resident software, microcode, and the like.

Furthermore, the invention can take the form of a computer program product accessible from a computer-usable or computer-readable medium (for example, media 918) providing program code for use by or in connection with a computer or any instruction execution system For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 904), magnetic tape, a removable computer diskette (for example, media 918), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 902 coupled directly or indirectly to memory elements 904 though a system bus 910. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 908, displays 906, pointing devices, and the like) can be coupled to the system either directly (such as via bus 910) or through intervening I/O controller's (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, providing on-demand selection, configuration, and composition of communication services, with dynamic context of communicating agents, enabled in a Web 2.0 paradigm.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for coordinating an on-demand communication-based mashup service, comprising the steps of:
    resolving a dynamic context of a receiver derived out of one or more mashed up web applications;

configuring a communication service with at least one parameter of the dynamic context of the receiver; and coordinating the communication service dynamically with protocol-level control at run-time with the one or more mashed up web applications based on the at least one parameter of the dynamic context of the receiver to compose an on-demand communication-based mashup service, wherein coordinating the communication service dynamically with protocol-level control at run-time with the one or more mashed up web applications based on the at least one parameter of the dynamic context of the receiver to compose an on-demand communication-based mashup service comprises using a service rules repository and a rules engine to leverage a mapping between one or more events captured by a service interface and a corresponding activity context to invoke a designated activity, and wherein the communication-based mashup service is composed in a mashup environment, and wherein the service is customizable based on the dynamic context of the receiver.

2. The method of claim 1, wherein at least one user is provided with a plurality of configurable communication services.

3. The method of claim 1, wherein at least one telecommunications service provider exposes at least one service as at least one configurable web service.

4. The method of claim 1, wherein at least one telecommunications service provider renders protocol-level control and coordination of a communication session to a user.

5. The method of claim 1, wherein at least one telecommunications service provider provides mediated control of a communication session via at least one web based tool, wherein the mediated control comprises run-time support for mediation between communication service semantics and web service semantics.

6. The method of claim 1, wherein the dynamic context comprises at least one attribute, and wherein the at least one dynamic contextual attribute comprise at least one of a specification of available device context, a network context, a location attribute, and a specification of an availability attribute indicating willingness and ability of the receiver.

7. The method of claim 1, wherein each of at least one interacting agent is represented with a virtual identity.

8. The method of claim 7, wherein each dynamic context is associated with a virtual communicating agent.

9. The method of claim 7, wherein the virtual identity of each of the at least one interacting agent is used to select, configure, compose and access at least one communication service.

10. The method of claim 1, further comprising:
facilitating a user to locate at least one vendor based on at least one attribute;
enabling the user to select a vendor based on the at least one attribute;
facilitating an interaction between the user and the vendor; and
providing a dynamic, presence-based matchmaking service between the user and a vendor.

11. The method of claim 10, wherein the at least one attribute comprises at least one of estimated time of arrival, customer satisfaction ranking, name of vendor, location, earliest availability and reputation of vendor.

12. The method of claim 10, wherein the interaction between the user and the vendor comprises at least one of a telephone call and a short message service (SMS) communication.

13. The method of claim 1, further comprising the steps of:
receiving a request from a service provider to have a participant service included in a coordinated communication-based mashup service;
creating a coordination context for the participant service, wherein the coordination context comprises a data structure containing an activity identifier;
providing the coordination context to the service provider and to a client tier for correspondence with one or more mashup applications; and
registering one or more roles of the participant service in the coordinated communication-based mashup service.

14. A computer program product comprising a tangible non-transitory computer readable recordable storage medium having computer readable program code for coordinating an on-demand communication-based mashup service, said computer program product including:
computer readable program code for resolving a dynamic context of a receiver derived out of one or more mashed up web applications;
computer readable program code for configuring a communication service with at least one parameter of the dynamic context of the receiver; and
computer readable program code for coordinating the communication service dynamically with protocol-level control at run-time with the one or more mashed up web applications based on the at least one parameter of the dynamic context of the receiver to compose an on-demand communication-based mashup service, wherein coordinating the communication service dynamically with protocol-level control at run-time with the one or more mashed up web applications based on the at least one parameter of the dynamic context of the receiver to compose an on-demand communication-based mashup service comprises using a service rules repository and a rules engine to leverage a mapping between one or more events captured by a service interface and a corresponding activity context to invoke a designated activity, and wherein the communication-based mashup service is composed in a mashup environment, and wherein the service is customizable based on the dynamic context of the receiver.

15. The computer program product of claim 14, further comprising computer readable program code for providing at least one user with a plurality of configurable communication services.

16. The computer program product of claim 14, wherein at least one telecommunications service provider exposes at least one service as at least one configurable web service.

17. The computer program product of claim 14, wherein at least one telecommunications service provider renders protocol-level control and coordination of a communication session to a user.

18. The computer program product of claim 14, wherein at least one telecommunications service provider provides mediated control of a communication session via at least one web based tool, wherein the mediated control comprises run-time support for mediation between communication service semantics and web service semantics.

19. The computer program product of claim 14, wherein the dynamic context comprises at least one attribute, and wherein the at least one dynamic contextual attribute comprise at least one of a specification of available device context, a network context, a location attribute, and a specification of an availability attribute indicating willingness and ability of the receiver.

20. The computer program product of claim 14, further comprising:
   computer readable program code for facilitating a user to locate at least one vendor based on at least one attribute;
   computer readable program code for enabling the user to select a vendor based on the at least one attribute;
   computer readable program code for facilitating an interaction between the user and the vendor; and
   computer readable program code for providing a dynamic, presence-based matchmaking service between the user and a vendor.

21. The computer program product of claim 20, wherein the at least one attribute comprises at least one of estimated time of arrival, customer satisfaction ranking, name of vendor, location, earliest availability and reputation of vendor.

22. An apparatus for coordinating an on-demand communication-based mashup service, comprising:
   a memory; and
   at least one processor coupled to said memory and configured to:
      resolve a dynamic context of a receiver derived out of one or more mashed up web applications;
      configure a communication service with at least one parameter of the dynamic context of the receiver; and
      coordinate the communication service dynamically with protocol-level control at run-time with the one or more mashed up web applications based on the at least one parameter of the dynamic context of the receiver to compose an on-demand communication-based mashup service, wherein coordinating the communication service dynamically with protocol-level control at run-time with the one or more mashed up web applications based on the at least one parameter of the dynamic context of the receiver to compose an on-demand communication-based mashup service comprises using a service rules repository and a rules engine to leverage a mapping between one or more events captured by a service interface and a corresponding activity context to invoke a designated activity, and wherein the communication-based mashup service is composed in a mashup environment, and wherein the service is customizable based on the dynamic context of the receiver.

23. The apparatus of claim 22, wherein the at least one processor coupled to said memory is further configured to provide at least one user with a plurality of configurable communication services.

24. The apparatus of claim 22, wherein at least one telecommunications service provider exposes at least one service as at least one configurable web service and wherein at least one telecommunications service provider renders fine-grained control and coordination of a communication session to a user.

25. The apparatus of claim 22, wherein at least one telecommunications service provider provides mediated control of a communication session via at least one web based tool, wherein the mediated control comprises run-time support for mediation between communication service semantics and web service semantics.

* * * * *